United States Patent [19]
Zhou et al.

[11] Patent Number: 6,102,994
[45] Date of Patent: Aug. 15, 2000

[54] ALUMINA-BASED HYDROPHILIC ANTIMICROBIAL COATING

[75] Inventors: Shaojun James Zhou, Palatine; Mahnaz Rezaie Keyvan, Naperville; Gary Seminara, Wonder Lake, all of Ill.; Helen Pickup, Redondo Beach, Calif.

[73] Assignee: AlliedSignal Inc., Morristown, N.J.

[21] Appl. No.: 09/040,842

[22] Filed: Mar. 18, 1998

Related U.S. Application Data

[60] Provisional application No. 60/041,129, Mar. 20, 1997.

[51] Int. Cl.$^7$ .................................................. C09D 5/14
[52] U.S. Cl. .................................... 106/15.05; 106/18.36; 165/133; 165/134.1; 422/618; 422/641; 422/691; 428/469; 428/472.2
[58] Field of Search ............................. 106/15.05, 18.36; 165/133, 134.1; 422/618, 641, 691; 428/469, 472.2

[56] References Cited

U.S. PATENT DOCUMENTS

| | | | |
|---|---|---|---|
| 4,491,623 | 1/1985 | Kokubo et al. | 428/658 |
| 4,491,624 | 1/1985 | Sarbacher et al. | 429/27 |
| 4,518,610 | 5/1985 | Umekawa et al. | 514/516 |
| 4,663,233 | 5/1987 | Beavers | 428/412 |
| 4,810,587 | 3/1989 | Losfeld et al. | 428/549 |
| 4,826,741 | 5/1989 | Aldhart et al. | 429/19 |
| 4,830,101 | 5/1989 | Ohara et al. | 165/133 |
| 5,028,453 | 7/1991 | Jeffrey et al. | 427/295 |
| 5,074,878 | 12/1991 | Bark et al. | 623/8 |
| 5,164,468 | 11/1992 | Ball et al. | 526/271 |
| 5,176,814 | 1/1993 | Spadaccini et al. | 422/198 |
| 5,232,672 | 8/1993 | Spadaccini et al. | 422/198 |
| 5,264,250 | 11/1993 | Steele et al. | 427/380 |
| 5,305,827 | 4/1994 | Steele et al. | 165/133 |
| 5,628,879 | 5/1997 | Woodruff | 202/234 |
| 5,643,457 | 7/1997 | Abramov et al. | 210/668 |

FOREIGN PATENT DOCUMENTS

WO 95 25143  9/1995  WIPO.

OTHER PUBLICATIONS

P Kuhn et al., "Condensing Heat Exchangers For European Spacecraft," Proceedings of 3$^{rd}$ European Symposium, The Netherlands Oct. 3–6, 1988.

Marsh et al., "Space Station Condensing Heat Exchanger Biofilm Formation and Control Evaluation," 22$^{nd}$ International Conference on Environmental Systems, Seattle, WA, Jul. 13–16, 1992.

Marsh et al., "Condensing Heat Exchanger Microbal Growth and Control Study," 23$^{rd}$ International Conference on Environmental Systems, Colorado Springs, CO, Jul. 12–15, 1993.

Chemical Abstract No. 112:58491, abstract of Japanese Patent Specification No. 01–223175, Sep. 1989.

Chemical Abstract No. 126:252484, abstract of Japanese Patent Specification No. 09–053028, Feb. 1997.

Patent Abstracts of Japan, vol. 014, No. 026 (M–921), Jan. 18, 1990 and JP 01 266493 A, Oct. 24, 1989.

Patent Abstracts of Japan, vol. 097, No. 007, Jul. 31, 1997 and JP 09 077620 A, Mar. 25, 1997.

Database WPI, Section Ch, Week 8942, Derwent Publications Ltd., London, GB, Class A82 AN 89–303708 XP00207112 and JP 01 222 943 A (Nippon Seihaku KK) (Sep. 1989).

*Primary Examiner*—Anthony Green
*Attorney, Agent, or Firm*—William J. Zak, Jr., Esq.

[57] ABSTRACT

A hydrophilic antimicrobial coating includes a porous ceramic-based coating and at least one biocide dispersed in the porous, hydrophilic ceramic-based coating. The coating can be an alumina coating, and the biocide can include silver oxide. A second biocide such as zinc oxide or copper oxide can also be dispersed in the porous, hydrophilic ceramic-based coating. The hydrophilic antimicrobial coating can be applied to a heat transfer surface of a heat exchanger.

16 Claims, 2 Drawing Sheets

ALUMINA-BASED HYDROPHILIC ANTIMICROBIAL COATING

This application claims priority under 35 USC §119 to provisional application Ser. No. 60/041,129 filed Mar. 20, 1997 for a Hydrophilic Antimicrobial Coating for a Condensing Heat Exchanger.

BACKGROUND OF THE INVENTION

The invention relates to hydrophilic coatings. More specifically, the invention relates to a hydrophilic antimicrobial coating.

An environmental control system for a manned spacecraft typically includes a condensing heat exchanger for controlling cabin temperature and cabin humidity. Cabin air is drawn into the condensing heat exchanger and circulated through air passageways. Heat from the drawn-in air is transferred to a coolant, which is circulated through coolant passageways within the condensing heat exchanger. As the drawn-in air is being cooled, condensate forms on the heat transfer surfaces of the air passageways. A slurper section at an air outlet of the condensing heat exchanger removes the condensate. The dehumidified air is circulated back to the cabin, and the condensate is dumped into space or treated for reuse.

The heat transfer surfaces of the air passageways are coated with a hydrophilic coating. The hydrophilic coating, which has an affinity for attracting, adsorbing or absorbing water, promotes the condensate to form a wetting film rather than droplets within the air passageways. Water droplets, if allowed to form, can cause problems in the micro-gravity environment of space. If strongly attached to the heat transfer surfaces, the water droplets will cause an increase in air pressure drop across the condensing heat exchanger and, consequently, a reduction in performance of the condensing heat exchanger. If not strongly attached, the water drops will become entrapped in the air stream and carried into the cabin. Quite literally, rain could fall inside the cabin.

The hydrophilic coating becomes wet during the operation of the condensing heat exchanger. The moisture, in turn, provides a potential breeding ground for microbes such as bacteria and fungi. Moisture levels between 15% and 35% will predominantly support the growth of fungi, while moisture levels above 35% will also predominantly support the growth of bacteria. The microbial growths could block air passages inside the condensing heat exchanger and, consequently, reduce performance of the condensing heat exchanger. The bacteria and fungi, if allowed to proliferate, could affect the health of crew members inside the cabin.

The microbes can be killed by adding biocides to the hydrophilic coating. The biocides dissolve in water and attack the microbes in a water-solution. For example, U.S. Pat. Nos. 5,264,250 and 5,305,827 disclose the use of a biocide such as silver oxide dispersed in a glass-based multiphase hydrophilic coating made of uncoated silica and calcium silicate particles.

However, the silver oxide is intrinsically hydrophobic. When the concentration of the silver oxide exceeds 1.5% of the total weight of the glass-based multiphase hydrophilic coating, it is believed that the hydrophilicity of the hydrophilic coating (i.e., the ability of the hydrophilic coating to promote the wetting film formation) is reduced. Thus, increasing the amount of silver oxide increases the likelihood of droplets forming inside the air passageways of the heat exchanger.

SUMMARY OF THE INVENTION

The invention can be regarded as a porous ceramic-based hydrophilic antimicrobial coating which allows greater amounts of biocide to be used without decreasing the hydrophilicity. The hydrophilic antimicrobial coating includes a porous, hydrophilic ceramic-based coating; and at least one biocide dispersed in the porous, hydrophilic ceramic-based coating.

DETAILED DESCRIPTION OF THE INVENTION

Figure 1:
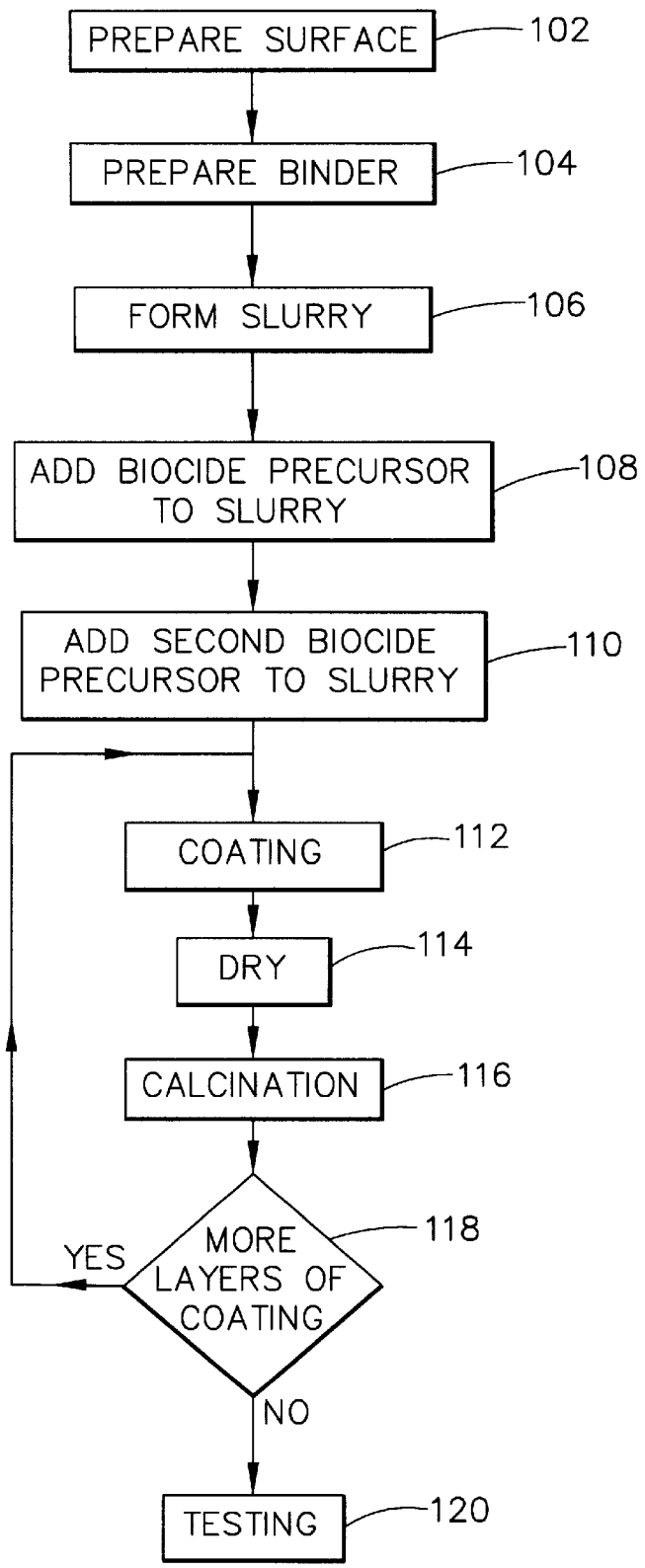
FIG. 1 is a flowchart of a method of making a hydrophilic antimicrobial coating according to the present invention.

FIG. 1 shows a method of making a hydrophilic antimicrobial coating for a surface. For exemplary purposes only, the surface will be described later (in FIGS. 2 and 3) as a heat transfer surface of a condensing heat exchanger. However, it is understood that the coating is not limited to such a surface and that other types of surfaces could be coated with the hydrophilic antimicrobial coating.

In step 102, the surface is prepared. The surface can be cleaned of particulate matter and substances such as grease. Cleaning agents or soapy water could be used. The surface can be dried with a compressed gas or dried in an oven. A thin active oxide/hydroxide layer could also be grown on the surface to facilitate coating adhesion. It should be noted that growing the layer is optional. The active layer could be formed in-situ at a later step, such as step 116 (calcination).

In step 104, a binder is made. The binder includes a mixture of de-ionized water, acid and alumina. The binder is produced by dissolving the alumina in the acid while heating and stirring. The alumina has a high dispersibility and solubility in acids such as nitric acid and hydrochloric acid. After the alumina has dissolved in the acid, the solution is cooled.

For example, a binder could be formed from alumina and 70% nitric acid. The binder could include 1% to 30% alumina and 2% to 60% nitric acid at 70% concentration, with the remainder being water or another acid.

Next a slurry can be formed by mixing sub-alpha alumina with the binder, water and a biocide. The slurry can be formed in a single stage or in multiple stages for example FIG. 1 shows that the slurry can be formed in several stages such as steps 106, 108 and 110. In step 106 the first stage of slurry formation is performed by mixing the alumina in the binder. The alumina can be mixed at ambient temperature until a desired pH and viscosity is achieved. Between 10% and 90% of the alumina can be used in the slurry, with the remainder being the binder. Increasing the amount of the alumina can result in thicker coatings. Thicker coatings, in turn, may allow for higher biocide loadings. The water can be added to adjust the viscosity.

In step 108 the second stage of slurry formation is performed by adding and mixing a biocide precursor in the slurry. Broad spectrum biocides which have been found effective over a wide range of bacteria and fungi include oxides of gold, silver, mercury, copper cadmium, chromium, cobalt, manganese, nickel, lead, zinc, iron and calcium, in the order of effectiveness. Other biocides include oxides of tin and arsenic. Higher loading of the biocide will reduce the time needed to kill the microbes and thereby extend the service of the coated surfaces. The selection of a biocide depends upon the biocidal requirements.

A biocide precursor such as silver is mixed in the slurry until a desired pH and viscosity are reached. The silver, expressed as silver oxide, amounts to between 0.5% and 15% of the total weight of solids in the hydrophilic antimicrobial coating. Since the slurry has a relatively short lifetime after the addition of the biocide, it is used soon after it has been prepared. The silver can be added in the form of a water soluble silver salt such as silver acetate or silver nitrate, or as water insoluble silver oxide, or as fine metallic silver. Mixing the silver can take between five minutes and six hours at ambient temperature.

In step 110, a second biocide precursor such as zinc or copper can also be mixed in the slurry. The second biocide has a percentage weight that is between 0.5 and 5% of the weight of the hydrophilic antimicrobial coating. If the second biocide precursor is added, the upper limit on the amount of silver oxide would be reduced to approximately 10% of the percentage weight of the hydrophilic antimicrobial coating. A secondary biocide such as zinc oxide or copper oxide can kill bacteria and fungi that have become resistant to silver or that are not normally killed by silver. The step 110 of adding the second biocide precursor can be performed at the same time as, or at a different time than, the step 108 of adding the first biocide precursor.

In step 112, the slurry is used to coat the surface. Dip coating allows complex objects to be coated. The object can be dipped into the slurry, or slurry can be pumped through the object. Additionally, dip coating allows the formation of a thin coating having a thickness between one and 100 microns. Thicker coatings can be built up over several dipping cycles. The dip coatings are calcined to obtain desirable properties. Coatings are typically porous, with porosity ranging between 10% and 90%. A more narrow range is between 30% and 70%.

The porous surface increases the overall surface area of the hydrophilic coating. Consequently, more biocide is exposed to the microbes. Thus, coatings having higher porosity can have greater surface area and, therefore, may have the ability to handle higher biocide loading. The higher biocide loading, in turn, can kill microbes faster and for longer periods of time. Additionally, pores in the coating create a capillary action that causes water to be drawn into the coating and exposed to the biocide.

In step 114, the hydrophilic antimicrobial coating can be dried. The hydrophilic antimicrobial coating can be dried by flowing a dry gas over the surface or by heating in an oven.

In step 116, the hydrophilic antimicrobial coating can be calcined in a clean furnace. The calcination also modifies the crystal structure and pore size distribution of the coating. Calcination can be performed in air between one-half hour and 36 hours at a temperature between 400° C. and 900° C.

If a thicker coating is desired (step 118), steps 112 to 116 can be repeated. If no additional coatings are to be made, the coated surface is tested for coating adhesion strength, contact angle, thickness, coating density and silver solubility (step 120).

An alumina-based coating can have three levels of hydrophilicity: the intrinsic hydrophilicity of the alumina, the hydrophilicity resulting from microporosity of the calcined alumina; and the hydrophilicity resulting from the macroporosity associated with the coating process. The microporosity and the macroporosity of the coating can be tailored by varying the coating density during the coating process or by varying the final firing temperature during calcination.

Figure 2:
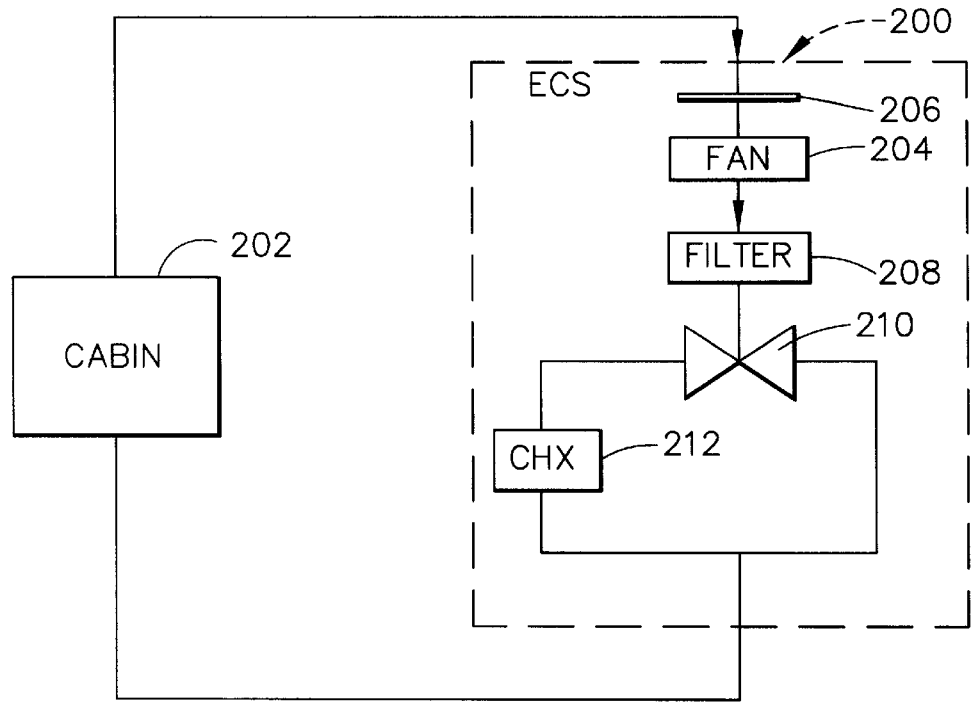
FIG. 2 is a block diagram of an environmental control system including a condensing heat exchanger having heat transfer surfaces covered with the hydrophilic antimicrobial coating.

FIG. 2 shows an environmental control system 200 for a cabin 202. A fan 204 pulls cabin air into the environmental control system 200 through a mesh screen 206 that filters out large particles and airborne debris. The air flows through a filter assembly 208, which removes small particles from the air. The filtered air then flows through a thermal control valve 210, which adjusts the flow of air entering into a condensing heat exchanger 212. The thermal control valve 210 also controls the flow of air bypassing the condensing heat exchanger 212. Temperature control is performed by mixing the cooled air from the condensing heat exchanger 212 with the air bypassing the condensing heat exchanger 212. The mixed air is recirculated back to the cabin 202.

Figure 3:
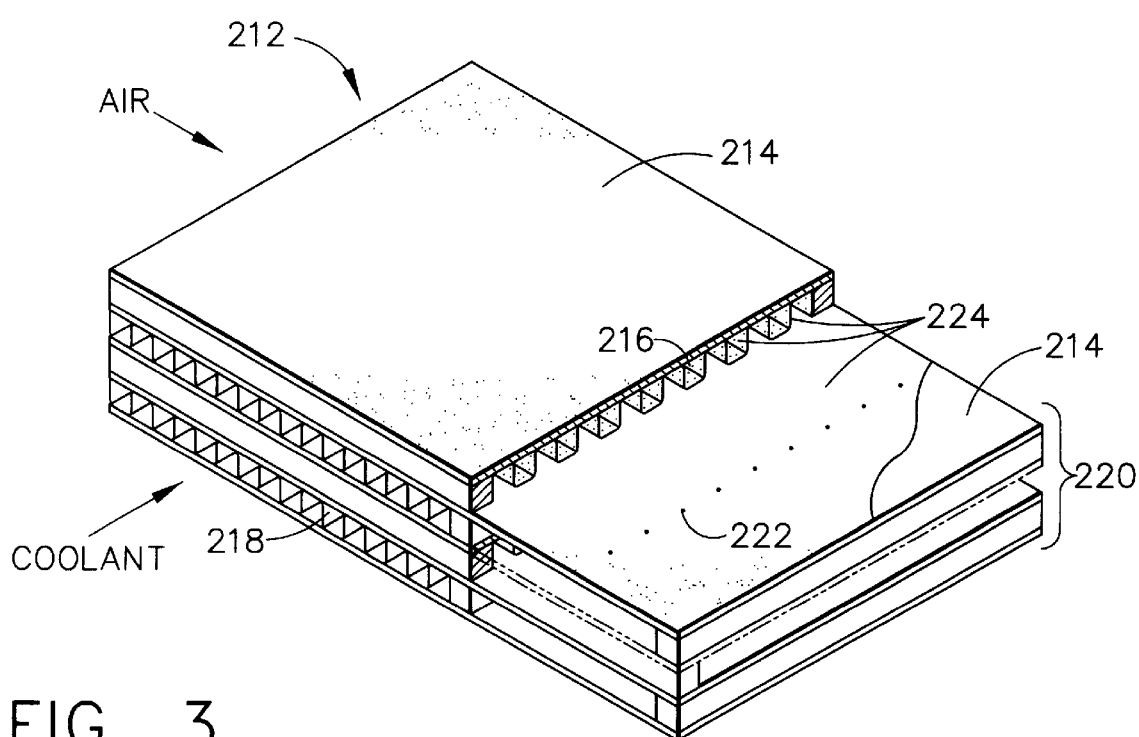
FIG. 3 is a perspective view of a portion of the condensing heat exchanger.

FIG. 3 shows a portion of the condensing heat exchanger 212 in greater detail. The condensing heat exchanger 212 is a metallic plate and fin unit having a crossflow configuration. A plurality of plates 214 separate two fluids: air and a coolant. A plurality of fins form air passageways 216 and coolant passageways 218. The plates 214 provide primary heat transfer surfaces, and the fins provide extended or secondary heat transfer surfaces. The coolant enters the heat exchanger 212 at a temperature below that of the air. As the air is cooled, water vapor in the air is condensed as saturation conditions are attained. Condensation occurs primarily on the heat transfer surfaces, but bulk steam condensation can also occur.

The heat exchanger 212 includes a slurper section 220 including a plurality of orifices 222 in the sheets 214. During operation of the slurper section 220, a small negative pressure is drawn through the slurper orifices 222 to pull through the air side condensate. The air side condensate is collected in a slurper pan (not shown) and either retained for further processing or disposed of.

The hydrophilic, antimicrobial coating 224 is compatible with materials (e.g., CRES 347) that are commonly used for the construction of heat exchangers. The hydrophilic antimicrobial coating 224 covers heat transfer surfaces of the air passageways 216 and the air-side heat transfer surfaces of the plates 214. The hydrophilic antimicrobial coating 224 enhances coalescence of water on the air-side heat transfer surfaces, and aids in the transport and collection of condensate in the orificed slurper section 220, all while promoting biocidal activity. Thus, the hydrophilic antimicrobial coating 224 kills microbes and ensures that water is channeled to the correct locations in the condensing heat exchanger 212.

The hydrophilic antimicrobial coating has been tested on heat transfer surfaces of metal substrates made of nickel, aluminum and CRES 347 stainless steel. It has been found that the hydrophilic antimicrobial coating is extremely hydrophilic, having contact angles that approach zero degrees. Tests have indicated that the hydrophilic antimicrobial coating is almost completely hydrophilic regardless of the weight percentage of silver oxide. Tests have also indicated that the hydrophilic antimicrobial coating has excellent adhesion strength. It has also been found that increasing the weight percentage of silver oxide increases adhesion strength.

Bactericidal and fungicidal kill tests have been performed using coated samples containing silver oxide having percentage weights between 1% and 10%. Bacterial and fungal concentrations were standardized at $10^7$ colony forming units (cfu) per test sample. For all coatings containing silver, the majority of the microbial load was killed after an exposure time of ten minutes. The microbial load was killed completely after two hours. The microbial kill rate increased with increasing silver oxide content in the coatings.

Thus disclosed is a ceramic-based hydrophilic antimicrobial coating that allows high biocide loading while retaining good hydrophilic properties. The high surface area and porous nature allows for large loading of biocides without significantly compromising the physical properties of the coating. The high surface area and porous nature also exposes microbes to the biocide(s) without requiring dissolution of the entire coating. The antimicrobial hydrophilic coating can be designed to have a long useful life, which would allow for long missions in space and industrial applications requiring durability. Because biocide is consumed during the life of the coated article, the higher biocide loading increases the lifetime of the coated article.

The ceramic-based coating can advantageously support more than one biocide. The addition of a second biocide such as zinc oxide or copper oxide can kill microbes that have become resistant to the primary biocide, silver oxide, or that are not normally killed by silver.

Although the antimicrobial hydrophilic coating has been described in connection with a condensing heat exchanger, it is not limited to such an apparatus. The coating could be applied to heat transfer surfaces of any heat exchanger. Moreover, the coating is not limited to heat exchangers. The coating could be applied to surfaces of a water separator or the surface of any other apparatus in which microbial proliferation is a major concern. For example, the coating could be applied to surfaces of an air conditioning system used in hospitals.

The invention is not limited to the specific embodiments described above. For example, the coating can be applied by a variety of techniques other than slurry dip coating. The alumina and biocide could be mixed in the slurry at the same time rather than separate stages.

Other binder systems, such as silica gel, silica epoxy and alumina gel, can be used. Additives can be added to the slurry to promote dispersion, improve adhesion, and affect other physical and chemical properties of the coating. Other types of biocides can be used. The selection of the biocide(s) will depend upon the type of microbes to be killed. Copper or zinc oxide could be used to enhance the effectiveness of the silver oxide. The quantity, pH and viscosity of the binder might depend upon the desired pH and viscosity of the slurry. The pH and viscosity of the slurry, in turn, might depend in part upon the piece to be coated. Lower viscosity might be more desirable for pieces having complex shapes. The binder can be made in a single batch or multiple batches. The porosity and pore size distribution of the hydrophilic antimicrobial coating can be adjusted by adjusting the coating process and the calcination temperature. These considerations, along with other considerations such as actual mixing times, heating times and temperatures, are specific to the materials being used and the application for which the invention is intended.

Therefore, the invention is not limited to the specific embodiments above. Instead, the invention is determined by the claims that follow.

We claim:

1. A hydrophilic antimicrobial coating compositon comprising:
    a porous, hydrophilic ceramic-based layer including sub-alpha alumina; and
    at least one biocide dispersed in the porous, hydrophilic ceramic-based layer.

2. The coating composition of claim 1, wherein the sub-alpha alumina is at least 85% of the weight of the coating composition.

3. The coating composition of claim 1, wherein silver oxide is dispersed in the porous, hydrophilic ceramic-based layer.

4. The coating composition of claim 3, wherein the silver oxide is between approximately 0.5% and 15% of the weight of the coating composition.

5. The coating composition of claim 3, wherein the silver oxide is between approximately 5% and 15% of the weight of the coating composition.

6. The coating composition of claim 1, wherein first and second biocides are dispersed in the ceramic-based layer.

7. The coating composition of claim 6, wherein the first biocide is silver oxide and the second biocide is zinc oxide.

8. The coating composition of claim 7, wherein the silver oxide is between 0.5% and 10% of the weight of the coating composition and the zinc oxide is between approximately 0.5% and 5% of the weight of the coating composition.

9. The coating composition of claim 6, wherein the first biocide is silver oxide and the second biocide is copper oxide.

10. The coating composition of claim 9, wherein the silver oxide is between 0.5% and 10% of the weight of the coating composition and the copper oxide is between approximately 0.5% and 5% of the weight of the coating composition.

11. The coating composition of claim 1, wherein porosity of the hydrophilic ceramic-based layer is between 10% and 90%.

12. The coating composition of claim 1, wherein porosity of the hydrophilic ceramic-based layer is between 30% and 70%.

13. Apparatus comprising:
    at least one heat transfer surface; and
    a hydrophilic antimicrobial coating on at least one heat transfer surface, the hydrophilic antimicrobial coating including a porous, hydrophilic alumina-based layer, and a biocide dispersed in the porous, hydrophilic layer.

14. The apparatus of claim 13, including a plate and fin unit having a plurality of heat transfer surfaces covered with the hydrophilic antimicrobial coating.

15. The apparatus of claim 14, wherein the plate and fin unit includes a slurper section; the hydrophilic antimicrobial coating covering air side heat transfer surfaces of the slurper section.

16. The apparatus of claim 13, wherein the layer includes silver oxide between approximately 0.5% and 15% of the weight of the hydrophilic antimicrobial coating.

* * * * *